Aug. 12, 1930.  W. W. EDSON  1,772,479
ELECTRICAL RELAY
Filed Sept. 2, 1926  2 Sheets-Sheet 1

WITNESSES:

INVENTOR
William W. Edson.
BY
ATTORNEY

Aug. 12, 1930.

W. W. EDSON 1,772,479

ELECTRICAL RELAY

Filed Sept. 2, 1926

2 Sheets-Sheet 2

WITNESSES:
C. J. Weller.

INVENTOR
William W. Edson.
BY
Wesley G. Carr
ATTORNEY

Patented Aug. 12, 1930

1,772,479

UNITED STATES PATENT OFFICE

WILLIAM W. EDSON, OF NEWTONVILLE, MASSACHUSETTS

ELECTRICAL RELAY

Application filed September 2, 1926. Serial No. 133,177.

My invention relates to electrical relays and particularly to protective relays for electrical distribution systems subject to short-circuits or other faults.

An object of my invention is to provide a protective relay for electrical distribution systems that is responsive to the surge of current produced by a fault, even though the fault current may be less than the peak-load current traversing the circuit under other conditions.

A further object of my invention is to provide a protective relay that shall be operatively energized when a surge occurs that has a substantially constant relation to the load current. In other words, the relay is designed to have a percentage characteristic and is more sensitive when the load current traversing the circuit is small then when it is large.

A further object of my invention is to provide an induction or energy-transforming device, such as a transformer, in connection with a time-element circuit-interrupter controlling device in order to obtain certain desired operating characteristics of said controlling device under the conditions which are commonly met in electrical distribution systems.

In a preferred form of the invention, the transforming device comprises a plurality of coils having a variable mutual inductance in order to change the energy transformation ratio and means for introducing a time-element in the changes in the mutual inductance between the coils. In this manner a circuit-controlling device may be obtained that is responsive only to surges of current even though the surge of current is smaller than the load current which traverses the circuit during times of peak-load.

Furthermore the circuit-controlling device will operate on a smaller surge of current when the initial current traversing the circuit is relatively small than is required when the initial current traversing the circuit is relatively large. This is a desirable characteristic in protective relays which are adapted to operate in the case of a short-circuit in an electrical distribution system because in many such systems, when the load is small, the generator capacity is reduced and the short-circuit current in the case of a fault is much less than the short-circuit current during peak-load periods when the entire generator capacity of the system is utilized.

Figure 1:
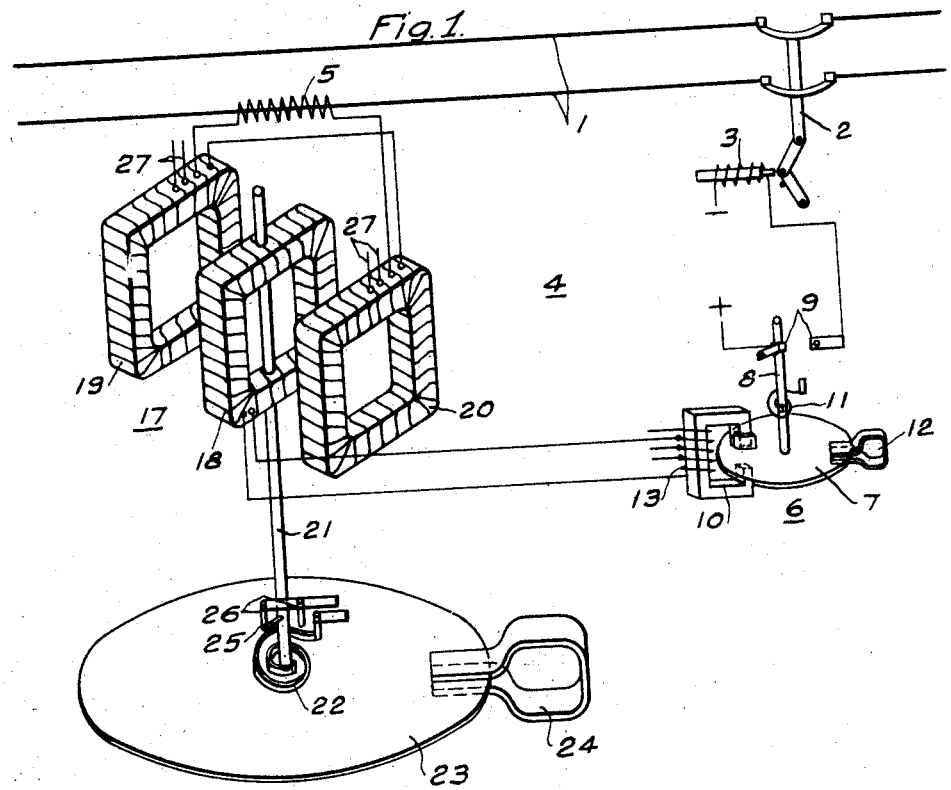
Figure 2:
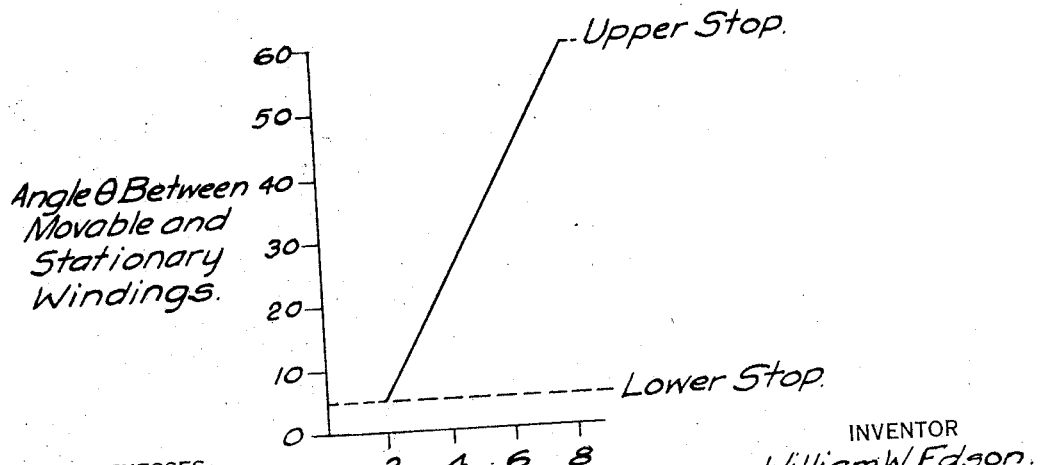
Figure 3:
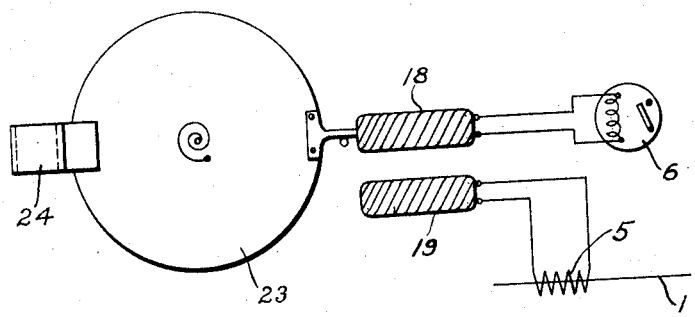
Figure 4:
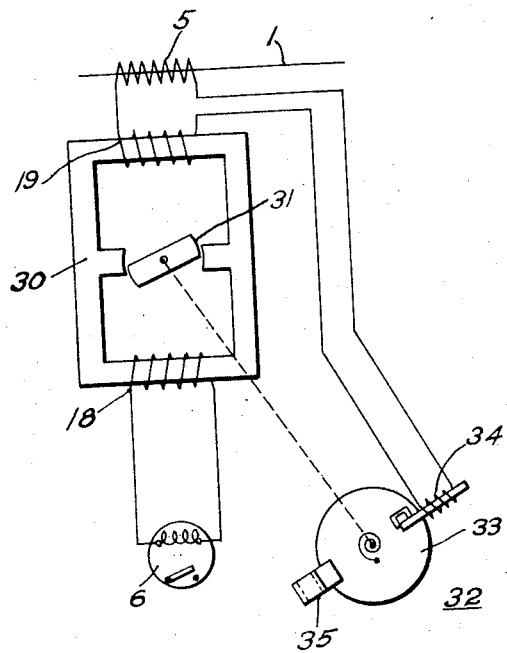

For a better understanding of my invention, reference may be had to the accompanying drawings, in which Fig. 1 is a diagrammatic view of an electrical system embodying my invention;

Fig. 2 is a graph illustrating the static characteristics of the relay shown in Fig. 1; and Figs. 3 and 4 are diagrammatic views of two modifications of the relay shown in Fig. 1 embodying my invention.

Referring to Fig. 1, an electrical distribution system is shown comprising a transmission circuit 1, a circuit-interrupter 2 therein provided with a tripping coil 3 controlled by a relay 4. The relay 4 is energized from the circuit 1 by means of the current transformer 5 connected in the circuit and comprises a time-element contact device 6 and an energy-transforming device 7 disposed between the contact device 6 and the circuit.

The time-element contact device 6 comprises a relay of the induction type, although any usual or well-known circuit-controlling device having the desired operating characteristics may be used. For example, instead of an overcurrent relay, a watt or impedance type of relay may be employed.

As shown, the induction relay 6 comprises a disc armature member 7, a pivoted shaft 8 on which said armature member is mounted and contact members 9 controlled by the shaft and adapted to control the circuit of the tripping coil 3 of the circuit-interrupter. The armature member 7 of the relay is provided with a shading-pole electromagnet 10, a restraining spring 11 and a damping magnet 12. The electromagnet 10 is provided with an actuating winding 13 having a series of taps as indicated.

The actuating winding 13 of the relay 6 is connected to a movable secondary coil 18 of the energy-transforming device 7. The movable coil 18 is disposed between two stationary primary coils 19 and 20 which are connected in series with the secondary winding of the current transformer 5. The coils 19 and 20 may be provided with taps, as indicated at 27, to take care of different current transformer ratios or different primary currents. The movable secondary coil 18 is pivotally mounted on a shaft 21 and the movement thereof is controlled by means of a restraining spring 22 and suitable damping means such as a disc member 23 and a permanent magnet 24 cooperating therewith. The movement of the movable coil 18 is also restricted by means of a pin 25 on the shaft 21 cooperating with the adjustable stops or abutment members 26.

When current is traversing the circuit 1, the fixed primary coils 19 and 20 are energized and establish a magnetic field traversing the movable secondary coil 18. The current induced in the movable coil 18 tends to cause the coil to turn by the interaction of the magnetic fields of the two sets of coils. The turning of the secondary coil 18 away from the plane in which it is parallel to the planes of the primary coils 19 and 20 reduces the magnitude of the current induced in the secondary winding so that it remains substantially constant instead of increasing in proportion to the current in the primary windings.

This characteristic is clearly shown in Fig. 2 which illustrates the relation between the angle between the two sets of coils and the primary current required to operate the relay connected to the secondary coil with one form of construction. The actuating winding 13 of the relay 6 is therefore energized at a substantially constant value irrespective of the current traversing the transmission circuit 1 provided the changes in the current traversing the circuit 1 take place so gradually that the movable coil 18 neutralizes their effect upon the actuating winding 13. If the current is excessively large, however, so that the movable coil 18 is turned until the pin 25 engages the upper stop 26, the relay 6 will be actuated by the load current to trip the circuit-interrupter 2 and open the circuit.

However, if a short-circuit occurs upon the transmission circuit 1, the surge of current in the circuit 1 results in a similar surge of current in the secondary winding 18 and in the actuating winding 13 of the relay 6 connected thereto. The relay 6 will be energized to trip the circuit-interrupter 2 and open the circuit even though the peak value of the surge of current may be less than the normal peak-load current that may traverse the transmission circuit 1 under other conditions.

The relation between the surge current and the load current or angular displacement between the coils may be changed from that shown by way of example in Fig. 2 by altering the proportions and arrangement of the coils and the strength of the restraining spring 22. The characteristic curve of Fig. 2 may thus be changed in slope and may also be non-linear.

The relay which I have described distinguishes between short-circuits and changes of load current because of the time lag in the movements of the movable winding 18 which are retarded by the damping means 23, 24. When the rate of change of current in the circuit 1 exceeds a predetermined value, a sufficiently large current is induced in the secondary circuit including the actuating winding 13 of the relay 6 to operate said relay before the turning effort of the movable coil 18 overcomes the damping means to reduce the secondary current by increasing the angularity between the primary and secondary coils. The apparatus may be adjusted to operate for desired values and rates of change of current by selecting suitable constants for the restraining spring 22 and damping means 23 and 24 and for the electromagnet 10, restraining spring 11, and the damping means 12 of the auxiliary contact device.

The provision of the adjustable stop members 26 permits the relay to operate on load current above the predetermined value and prevents the operation upon surges below a predetermined value such as may occur when the system is initially connected into service.

In Fig. 3 I have shown a modification of my invention which involves stationary and movable inductively related coils 18 and 19 similar to those shown in Fig. 1 and having similar functions. In this modification, however, the coil 18 is mounted directly upon the disc member 23 to simplify the mechanical structure of the relay. The operation of the relay shown in this figure is identical with that already described.

In Fig. 4 I have shown a further modification of my invention in which the inductively related coils 18 and 19 of the energy-transforming device are both wound upon a stationary magnetizable core member 30. The mutual inductance of the windings 18 and 19 in this modification is controlled by a movable magnetizable shunt member 31 so controlled by an electromagnetic device 32 that the position of the shunt member varies in accordance with the magnitude of the current traversing the circuit 1.

As shown, the electromagnetic device 32 may comprise a disc armature member 33 and a shading-pole electromagnet 34 connected in series with the winding 19 and the current transformer 5. A damping magnet 35 may be provided, if desired, to retard the movement of the shunt member 31. A reduction gearing may be substituted for the damping magnet 35 to provide the desired time-element in the operation of the shunt member 31. It is believed that the operation of the device shown in Fig. 4 will be obvious from the detailed description above in connection with Fig. 1.

I do not consider that my invention is limited to the modifications which I have shown and described as various other modifications within the scope thereof will occur to those skilled in the art. For example, the relay might be used for signalling purposes or be made responsive to surges of voltage, power, reactive volt-amperes or other electrical quantities. I desire, therefore, that my invention shall not be limited in scope except as set forth in the appended claims.

I claim as my invention:

1. An overcurrent relay for alternating-current electrical circuits comprising a time-element contact device having an actuating winding and means for energizing said winding from the circuit, said means including inductively related coils having variable mutual inductance connected to the circuit and actuating winding, respectively, and means for introducing a time-element in the changes in mutual inductance between the coils.

2. A relay for electrical circuits comprising a contact device and means for controlling the same in accordance with the rate of change of an electrical quantity of the circuit and independent of the magnitude of said quantity, said means including inductively related coils having variable mutual inductance and means whereby the changes in mutual inductance between the coils are functions of time.

3. A relay for electrical circuits comprising a time-element contact device having an actuating winding, an inductive device having stationary and movable windings, one of said windings being connected to the circuit and the other to said actuating winding, a pivoted shaft for the movable winding, a restraining spring connected to said shaft, means for limiting the turning of said shaft and movable winding and damping means for the shaft.

4. An over-current relay for an alternating-current electrical circuit comprising a winding, co-operating contact members, and means, including said winding, for moving said contact members into engagement in accordance with the rate of increase of current in said circuit and independent of the magnitude of said current.

5. A relay protective system for an electric circuit including a relay having an actuating winding, and means for operatively energizing said winding only upon the occurrence of a surge condition in said circuit comprising inductively related coils connected to said circuit and actuating winding, respectively, means responsive to the current traversing said circuit for varying the mutual inductance of said coils to maintain the energization of said actuating winding substantially constant for normal fluctuations of current in said circuit, and means for imparting a time-element in the variation of said mutual inductance.

In testimony whereof, I have hereunto subscribed my name this sixteenth day of August, 1926.

WILLIAM W. EDSON.